No. 740,671.

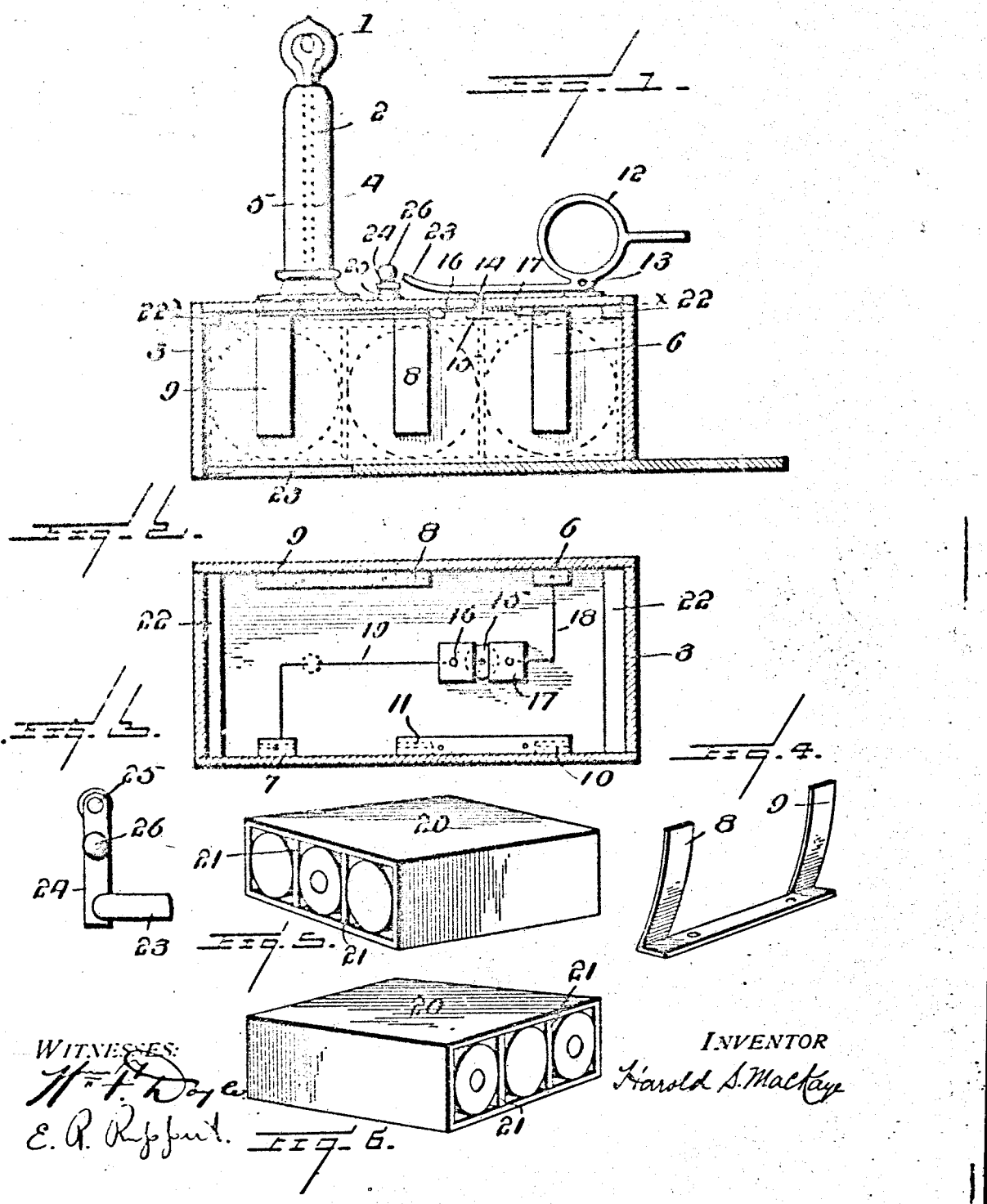

Patented October 6, 1903.

UNITED STATES PATENT OFFICE.

HAROLD S. MacKAYE, OF YONKERS, NEW YORK.

PORTABLE ELECTRIC LIGHT.

SPECIFICATION forming part of Letters Patent No. 740,671, dated October 6, 1903.

Application filed May 19, 1903. Serial No. 157,788. (No model.)

*To all whom it may concern:*

Be it known that I, HAROLD S. MACKAYE, a citizen of the United States, residing in the city of Yonkers, in the county of Westchester and State of New York, have invented a certain new and useful Improvement in Portable Electric Lights, of which the following is a specification.

One object of the present invention is the provision of an improved interior arrangement of batteries and their connections requiring no solder and making it impossible for any user to put the battery into the box in the wrong way.

Another object of the invention is the provision of means whereby an electric candle shall light automatically when lifted, the same being preferably also arranged to be lighted when not lifted, if desired. The means for accomplishing these two objects are not necessarily combined in order to come within the scope of this invention; but I prefer the construction herein shown, wherein both of said objects are secured at once.

My invention is illustrated in its preferred form in the accompanying drawings, wherein—

Figure 1 is a longitudinal section of my improved candle. Fig. 2 is an inverted plan of the same. Fig. 3 is a detail plan of the swinging circuit-closer. Fig. 4 is a perspective view of one of the double contact-springs, and Figs. 5 and 6 are opposite perspective views of the battery-box preferably used with this candle.

In Fig. 1 the position of the battery of three cells is indicated in dotted lines. Here the electric lamp 1 on the artificial candle 2 is connected to the battery within the box or stand 3 by the wires 4 and 5, shown in dotted lines. Each side of the box 3 is provided with as many spring-terminals as there are battery-cells. In the form shown and preferred there are three springs on each side, two of which are electrically connected together on each side. The springs 6 on one side and 7 on the other are single springs. Springs 8 and 9 on one side and 10 and 11 on the other are in pairs, as best shown in Fig. 4. The box is provided with a suitably-shaped handle, as 12, hinged to the box, as at 13, and from which depends a stem 14, carrying a circuit-closing button or bridging-piece 15. This stem passes through the bottom of the box between two metallic terminals 16 and 17, fastened to said bottom within the box. These terminals in the preferred construction shown are respectively connected by wires 18 or 19 or otherwise to the single spring 6 and one of the conductors 4 5, leading to the lamp 1.

The battery consists of three cells laid side by side within a thin rectangular tube or inner box 20 and separated by insulating-partitions 21. Inspection of Figs. 5 and 6 will show that these cells are laid in each box with their zinc and carbon ends alternating at both sides of the battery. Ordinary dry-battery cells are shown, such as are common for portable electric lights.

When the inner box 20 is laid into the outer candle-box 3, it rests on the strips 22, thus leaving a space under the box 20 for play of the button 15, and the cells assume the positions indicated in dotted lines in Fig. 1. The spring-contacts each make electric contact with one end of one cell on both sides of the battery.

The sliding lid having been pushed back into place in the groove 23, when the candle is lifted by the handle 12 its weight causes its forward end to tilt downward on the hinge 13 until the button 15 comes against 16 and 17 to support the whole. This closes circuit as follows: from the right-hand cell in Fig. 1 to spring 6, by wire 18 to 17, 15, and 16, by wire 19 to the lamp conductors 4 and 5 and the lamp 1, by spring 7 to the left-hand battery-cell in Fig. 1, by springs 9 and 8 to the middle cell, across the springs 11 and 10, and thus back to the starting-point. On putting down the candle the weight of the button 15 and its portion of the handle 12 will open circuit. It is evident that it makes no difference which way the battery is put in.

For lighting the candle when not lifted the handle 12 is preferably provided with an upturned beak 23. The arm 24 is pivoted at 25 in such a position that when turned under the beak 23 by the handle 26 it wedges said beak upward, and with it the button 15, closing circuit as long as kept in this position.

The form of switch last described may be replaced by any other without departing from my broad invention, and any desired interior electrical connections may be used without departing from this invention so far as automatic lighting is concerned. The specific interior connections are also herein claimed whether used with or without the means for automatic lighting.

A number of changes may be made in the construction herein described without departing from my invention, and I am not to be limited to the details herein shown and described except as specifically expressed in the respective claims hereof.

What I claim is—

1. A box carrying an electric lamp and its conductors, contact-springs at the sides of said box and a dry battery fitting said box and having its cells placed with electrodes alternately positive and negative exposed at both ends so as to make contact with said springs, substantially as described.

2. A box carrying an electric lamp and its conductors, three contact-springs on each side two of which on each side are permanently connected together electrically, the single spring on each side being diagonally opposite to that on the other and a three-cell battery in said box making contact with said springs, substantially as described.

3. In combination with a box carrying an exterior electric lamp and an interior battery, a handle hinged to said box and a circuit-closer adapted for operation by movement of said handle about its hinge when said handle is normally used to lift the box, substantially as described.

4. In combination with a box carrying an exterior electric lamp and an interior battery, a handle hinged to said box so as to tilt upward relatively to the box when the latter is lifted by said handle and a circuit-closer adapted for operation by the relative movement of box and handle on lifting said box by said handle, substantially as described.

5. A box carrying an external electric lamp and an interior battery, a handle hinged to said box, a stem attached to said handle and passing into said box, a metal bridging-piece on said stem and two metal strips in the lamp-circuit adapted to be mutually connected by said bridging-piece, substantially as described.

6. A box carrying an external electric lamp and an interior battery, means for lifting the whole comprising a bridging-piece adapted to move when the candle is lifted and two contact-pieces in the lamp-circuit against which said bridging-piece abuts when the candle is lifted, substantially as described.

7. A box carrying an electric lamp and a battery therefor, one member of a circuit-closing switch carried by said box and a handle carrying the second member of said circuit-closing switch said handle being hinged so as normally to fall into a position corresponding to separation of said switch members, but so as to bring said members together when said handle is turned around its hinge for lifting the box, substantially as described.

8. An exterior box, an interior battery-box, means within the outer box for separating the two boxes, a bridging-piece in the space thus made and means extending through the box for moving said bridging-piece, substantially as described.

HAROLD S. MACKAYE.

Witnesses:
THOMAS C. NEWTON,
GEO. B. SCHLEY.